US 6,751,454 B2

(12) United States Patent
Thornton

(10) Patent No.: US 6,751,454 B2
(45) Date of Patent: Jun. 15, 2004

(54) SYSTEM AND METHOD FOR SAMPLING AUDIO RECORDINGS ON A WIRELESS COMMUNICATION DEVICE

(75) Inventor: Kevin Thornton, San Diego, CA (US)

(73) Assignee: Leap Wireless International, Inc., San Diego, CA (US)

(*) Notice: Subject to any disclaimer, the term of this patent is extended or adjusted under 35 U.S.C. 154(b) by 0 days.

(21) Appl. No.: 09/865,551

(22) Filed: May 29, 2001

(65) Prior Publication Data
US 2002/0183042 A1 Dec. 5, 2002

(51) Int. Cl.[7] .................................................. H04Q 7/20
(52) U.S. Cl. ............................... 455/412.1; 455/412.2; 455/67.1; 455/557; 370/310; 370/356; 704/500
(58) Field of Search ........................... 455/412.1, 67.1, 455/557, 412.2; 370/310, 356, 395.1, 352, 354; 704/500; 379/900

(56) References Cited

U.S. PATENT DOCUMENTS

| 5,237,157 | A | | 8/1993 | Kaplan ........................ 235/375 |
|---|---|---|---|---|
| 5,510,606 | A | | 4/1996 | Worthington et al. ........ 235/472 |
| 5,528,281 | A | | 6/1996 | Grady et al. .................... 348/7 |
| 5,675,734 | A | | 10/1997 | Hair .............................. 395/200 |
| 5,754,784 | A | * | 5/1998 | Garland et al. ............... 709/219 |
| 5,774,798 | A | | 6/1998 | Gaskill ......................... 455/186 |
| 5,848,396 | A | | 12/1998 | Gerace ........................... 705/10 |
| 5,852,775 | A | | 12/1998 | Hidary ......................... 455/404 |
| 5,857,156 | A | | 1/1999 | Anderson ..................... 455/517 |
| 5,864,579 | A | | 1/1999 | Briskman ..................... 375/200 |
| 5,894,119 | A | | 4/1999 | Tognazzini .................. 235/375 |
| 5,963,916 | A | | 10/1999 | Kaplan ........................... 705/26 |
| 5,970,473 | A | | 10/1999 | Gerszberg et al. ............. 705/26 |
| 5,991,735 | A | | 11/1999 | Gerace ........................... 705/10 |
| 6,032,195 | A | | 2/2000 | Reber et al. .................. 709/245 |
| 6,038,295 | A | | 3/2000 | Mattes ...................... 379/93.25 |
| 6,050,898 | A | | 4/2000 | Vange et al. ................... 463/42 |
| 6,055,510 | A | | 4/2000 | Henrick et al. ................ 705/14 |
| 6,067,529 | A | | 5/2000 | Ray et al. ....................... 705/26 |
| 6,087,956 | A | | 7/2000 | Helferich ...................... 709/229 |
| 6,113,494 | A | | 9/2000 | Lennert ......................... 463/31 |
| 6,134,532 | A | | 10/2000 | Lazarus et al. ................. 705/14 |
| 6,134,593 | A | | 10/2000 | Alexander et al. |
| 6,138,030 | A | | 10/2000 | Coombes et al. |
| 6,157,841 | A | | 12/2000 | Bolduc et al. ............... 455/456 |
| 6,181,927 | B1 | | 1/2001 | Welling, Jr. et al. ......... 455/414 |
| 6,208,866 | B1 | | 3/2001 | Rouhollahzadeh et al. . 455/456 |
| 6,216,129 | B1 | | 4/2001 | Eldering ....................... 707/10 |
| 6,222,838 | B1 | * | 4/2001 | Sparks et al. ................ 370/352 |
| 6,223,291 | B1 | | 4/2001 | Puhl et al. .................... 713/201 |
| 6,246,672 | B1 | * | 6/2001 | Lumelsky .................... 370/310 |
| 6,535,507 | B1 | * | 3/2003 | Li et al. ....................... 370/356 |
| 2001/0005839 | A1 | | 6/2001 | Maenpaa et al. .............. 705/65 |
| 2001/0011248 | A1 | | 8/2001 | Himmel et al. ................ 707/39 |
| 2001/0013037 | A1 | | 8/2001 | Matsumoto ..................... 707/5 |
| 2001/0014911 | A1 | | 8/2001 | Doi et al. ..................... 709/221 |

FOREIGN PATENT DOCUMENTS

| EP | 1066867 A2 | 1/2001 |
|---|---|---|
| EP | 1066868 A2 | 1/2001 |
| EP | 1086732 A1 | 3/2001 |
| EP | 1087323 A1 | 3/2001 |

* cited by examiner

Primary Examiner—William Trost
Assistant Examiner—Danh C Le
(74) Attorney, Agent, or Firm—Reed Smith LLP

(57) ABSTRACT

A method for sampling music on a wireless communication device is presented that allows a user connected to a data network through a wireless communication device to preview audio items prior to making a purchasing decision. The wireless device establishes a first data connection to a data server and navigates through a menu system and selects to listen to an audio item. The data server instructs the wireless device to terminate the first data connection and establish a voice connection with an audio server. The audio server, which is notified by the data server of the audio item and the particular wireless device, plays the audio item once the voice connection is established with the wireless device. The wireless device subsequently establishes a second data connection with the data server and resumes navigation through the menu system at the point where the first data connection was terminated.

18 Claims, 9 Drawing Sheets

US 6,751,454 B2

SYSTEM AND METHOD FOR SAMPLING AUDIO RECORDINGS ON A WIRELESS COMMUNICATION DEVICE

RELATED APPLICATION

The present application relates to U.S. provisional patent application entitled VOICE ATTACHMENT TO AN EMAIL USING A WIRELESS COMMUNICATION DEVICE, filed Mar. 29, 2001, Ser. No. 60/279,439, which is hereby incorporated by reference in its entirety.

BACKGROUND OF THE INVENTION

1. Field of the Invention

The present invention relates generally to wireless communications and, more particularly, relates to a system and method for reviewing audio items on a wireless communication device prior to making a purchase decision.

2. Related Art

The advent of wireless personal communications devices has revolutionized the telecommunications industry. Cellular, personal communications services ("PCS") and other services provide wireless personal communications to businesses and individuals at home, in the office, on the road, and at any other location the wireless network can reach. Wireless telephone subscribers no longer must use public telephones along the road or wait until returning to the home or office to check messages or to return important business calls. Instead, wireless subscribers can carry out day-to-day business from the privacy of an automobile, from a remote job site, while walking along the airport concourse, and anywhere else that a personal communications signal is accessible.

Thus, it is no surprise that since the introduction of the cellular telephone service, the number of wireless telephone subscribers has increased steadily. Today, there are a staggering number of wireless telephone subscribers whose ranks are growing rapidly. In fact, many households have multiple wireless telephones in addition to their conventional land line services.

With a market of this size, there is fierce competition among hardware manufacturers and service providers. In an attempt to lure customers, most providers offer handsets with desirable features or attributes such as small size, light weight, longer battery life, speed dial, and the like. Many recent additions to the marketplace include multi-functional handsets that even provide pocket organizer functions integrated into the wireless handset. Most manufacturers, however, are still scrambling to add new features to their wireless communication devices to snare a portion of this booming market.

One way in which new features are added to wireless communication devices is by integrating the devices into the World Wide Web ("Web"). Such integration allows the countless services available through the Web to be extended to wireless communications devices. One such service allows a wireless device to connect to a Web server that provides desirable content from the Web such as stock quotes and sports scores. Additionally, services such as on-line shopping are also becoming widely available to wireless consumers.

A significant drawback of on-line shopping with a wireless device is that items cannot be seen or experienced as they can when using the resource rich platform offered by a conventional computer connected to the Web. For example, the minimal display size of a wireless device, its limited processing power, limited memory, limited ability to display complex graphics and colors, and limited bandwidth severely restrict the ability of wireless consumers to see, interact with, and preview items. These restrictions have a negative impact on purchasing decisions made by wireless consumers.

One particular problem is encountered when wireless consumers are shopping for audio items such as a book-on-tape, a musical compact disc ("CD"), or a movie soundtrack. Due to the limited bandwidth and processing power of the wireless device, the Web server cannot economically send the audio item to the wireless device for local playback. Moreover, due to the nature of the packet switched data transmission between the wireless device and the Web server, the audio item cannot be delivered from the Web server to the wireless device with commercially reliable quality.

Accordingly, what is needed is a system and method that overcomes the significant problems of the conventional wireless consumer shopping systems as described above.

SUMMARY OF THE INVENTION

The present invention provides a system and method for wireless consumers to listen to an audio item prior to making a purchase decision while shopping on-line. Typically, a wireless consumer that shops on-line does so by connecting to a data server computer from a wireless device. The data server computer exchanges data with the wireless device, thereby allowing the wireless consumer to navigate through a menu system containing various shopping options and selections. When the wireless consumer desires to purchase an audio item, the decision to purchase can be advantageously facilitated by allowing the wireless consumer to listen to the audio item through the wireless communication device.

Initially, the wireless consumer establishes a first data connection to the data server computer. This connection allows the wireless consumer to navigate through the menu system and select the particular audio item of interest. The wireless consumer also selects the option for listening to the audio item. The data server computer then instructs the wireless device to terminate the first data connection and establish a voice connection with an audio server computer. Additionally, the data server computer informs the audio server computer of an impending voice connection from the wireless device. In particular, the data server computer sends a unique audio item identification and wireless device identification to the audio server computer.

The audio server, after identifying the wireless device and establishing the voice connection, plays the audio item over the voice connection for the wireless consumer. The audio server computer may also play a preamble before playing the audio item over the voice connection. For example, the preamble may state the name of the song and artist about to be played, or perhaps introduce the song with a brief advertisement. Once the audio item has been played, the wireless consumer may have the option to listen to additional audio items or terminate the voice connection.

Subsequently, after the voice connection has been terminated, the wireless device can establish a second data connection with the data server and resume navigation through the menu system containing various shopping options and selections at the point where the first data connection was terminated.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE INVENTION

Certain embodiments as disclosed herein provide a method for on-line consumers to preview audio items through a wireless communications device. For example, one method as disclosed herein allows the user of a wireless communications device to listen to an audio item prior to making an on-line purchase of the audio item. For example, the audio item could be a compact disc that includes a particular song that the user previews prior to purchasing the compact disc ("CD").

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
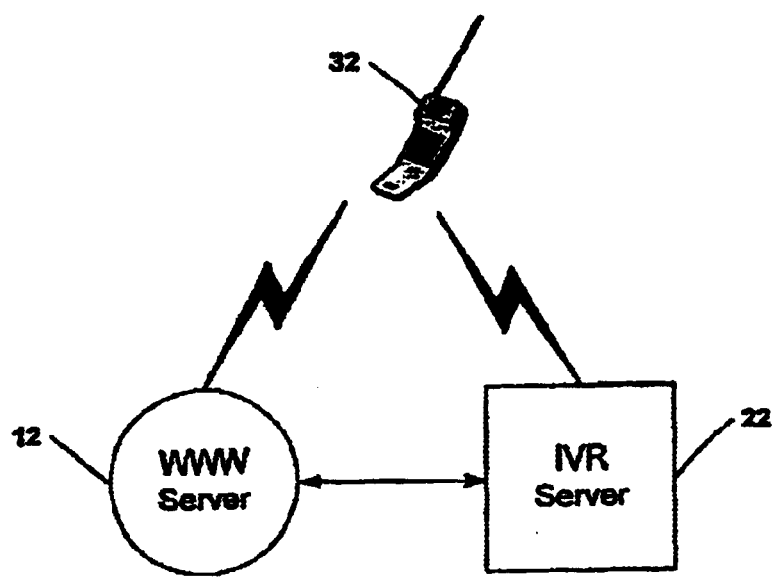
FIG. 1 is a top level block diagram illustrating an example system architecture according to an embodiment of the present invention.

FIG. 1 is a top level block diagram illustrating an example system architecture according to an embodiment of the present invention. WWW server 12 is communicatively coupled with Interactive Voice Response (IVR) server 22 and Wireless Communications Device (WCD) 32. In one embodiment, WWW server 12 and IVR server 22 can be housed in a single computer, such as the computer described below with reference to FIG. 12. Alternatively, WWW server 12 and IVR server 22 can each reside on a separate computer. WCD 32 is communicatively coupled with WWW server 12 and IVR server 22 through a wireless communications network (not pictured).

Figure 2:
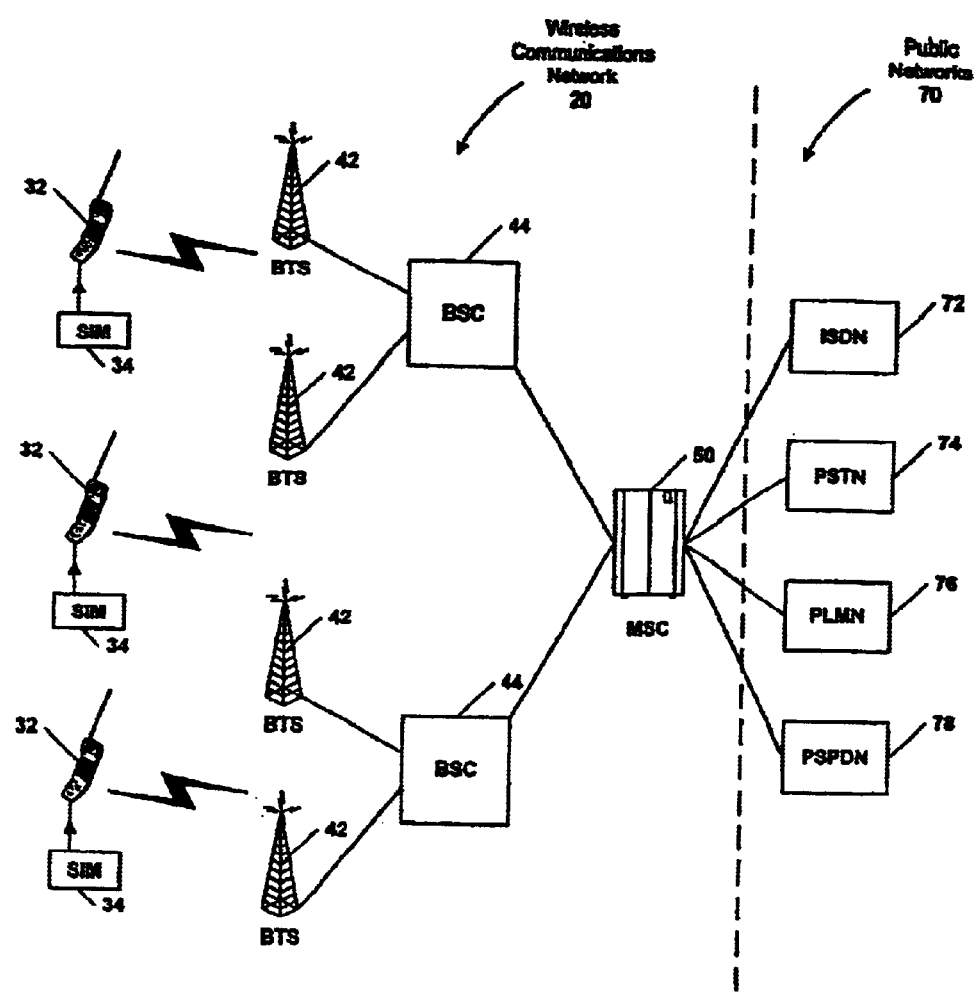
FIG. 2 is a block diagram illustrating an example implementation of a wireless communications network according to an embodiment of the present invention.

FIG. 2 is a block diagram illustrating an example implementation of a wireless communications network 20 according to one embodiment of the present invention. Wireless communications network 20 may be comprised of a plurality of wireless communication devices ("WCD") 32, base transceiver stations ("BTS") 42, base station controllers ("BSC") 44, and mobile switching centers ("MSC") 50.

WCD 32 may communicate with public networks 70 through MSC 50 of the wireless communications network 20. Examples of public networks 70 that MSC 50 may interface with include Integrated Services Digital Network ("ISDN") 72, Public Switched Telephone Network ("PSTN") 74, Public Land Mobile Network ("PLMN") 76 and Packet Switched Public Data Network ("PSPDN") 78.

Generally, WCD 32 is the mobile device or phone carried by a wireless consumer and BTS 42 interfaces with multiple WCDs 32 and manages the radio transmission paths between the WCDs 32 and BTS 42. BSC 44 manages the communication flow between a plurality of WCDs 32 and multiple BTSs 42. For example, BSC 44 can facilitate a handoff wherein communication with a WCD 32 is passed from a first BTS 42 to a second BTS 42. This can be done, for example, when a wireless consumer is traveling in an automobile and moving out of range of the first BTS 42 and into range of the second BTS 42. Additionally, BSC 44 handles communication traffic with MSC 50. As described above, MSC 50 may interface with a plurality of public networks 70.

WCD 32 may include a subscriber identity module ("SIM") 34. WCD 32 can typically be a digital mobile phone or handset. SIM 34 may be a memory device that stores subscriber and handset identification information. SIM 34 may be implemented as a smart card or as a plug-in module that activates particular services from any WCD 32. Among the information stored on SIM 34 may be a unique International Mobile Subscriber Identity ("IMSI") that identifies the subscriber to wireless communication network 20, and an International Mobile Equipment Identity ("IMEI") that uniquely identifies the mobile equipment. Alternatively, a unique identifier for the mobile WCD 32 may be the telephone number assigned to the WCD 32. Other information, such as a personal identification number ("PIN") and billing information, may also be stored on SIM 34.

WCD 32 can communicate with BTS 42 using a standardized radio air interface, colloquially referred to as the "Um" interface. BTS 42 is usually in the center of a cell and consists of one or more radio transceivers with an antenna. BTS 42 establishes radio links and handles radio communications over the Um interface with a plurality of WCDs 32 within the cell. The transmitting power of the BTS 42 defines the size of the cell.

Each BSC 44 can manage multiple (as many as hundreds) BTSs 42. Communication between BTS 42 and BSC 44 takes place over a standardized interface, which is specified by the industry to be standardized for all manufacturers. The BSC 44 may allocate and manage radio channels and control the hand-over of calls between BTSs 42.

Each BSC 44 communicates with MSC 50 over a standardized interface. MSC 50 may manage communications between two mobile subscribers at separate WCDs 32. Additionally, MSC 50 may manage communications between a wireless consumer at WCD 32 and a WWw server computer or an interactive voice response ("IVR") server computer in one of the public networks 70.

Figure 3:
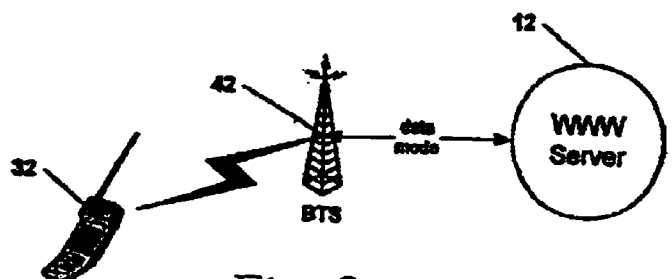
FIG. 3 is a top level block diagram of a conventional wireless Web architecture as presently known in the art.

FIG. 3 is a top level block diagram of a conventional wireless Web architecture as presently known in the art. WCD 32 is connected to WWW server 12 through a wireless communications network (not shown in entirety) including BTS 42. The WCD 32 communicates with WWW server 12 in data mode, which allows for the exchange of data in discrete packets. Packets are passed between WCD 32 and WWW server 12 using packet switching technology that allows individual packets to take separate routes to their destinations and arrive out of order. Although there are several advantages to packet switched communication, packet switched data transmission does not provide the reliability and robust quality required for the transmission of audio and voice.

Figure 4:
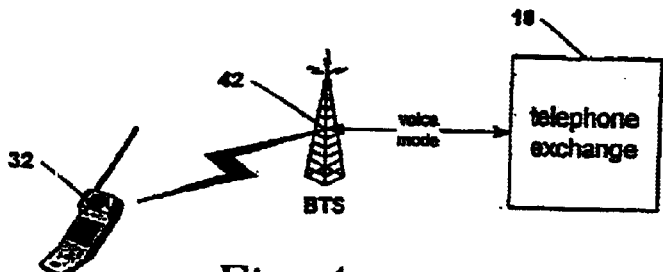
FIG. 4 is a top level block diagram of a conventional wireless telephone architecture as presently known in the art.

FIG. 4 is a top level block diagram of a conventional wireless telephone architecture as presently known in the art. WCD 32 is connected to telephone exchange 18 through a wireless communications network (not shown) including BTS 42. The WCD 32 communicates through the telephone exchange 18 in voice mode, which provides a dedicated circuit for audio communications between the WCD 32 and the device with which it is temporarily connected. The dedicated circuit of voice mode provides the robustness needed to deliver quality voice and audio between two devices in a communications network. Audio and voice travel between devices serially, using the same network path and arriving in the same order they were sent.

Figure 5:
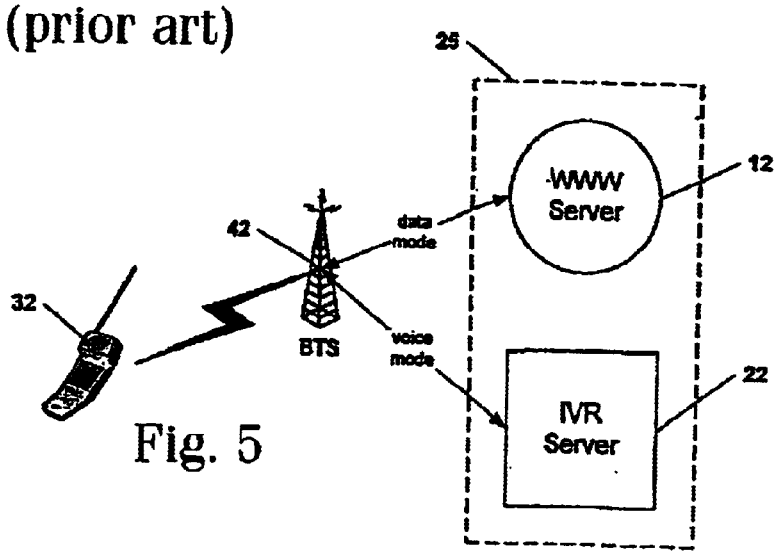
FIG. 5 is a block diagram illustrating an example architecture for providing audio items to a wireless device according to an embodiment of the present invention.

FIG. 5 is a block diagram illustrating an example architecture for providing audio items to a wireless device according to an embodiment of the present invention. WCD 32 is connected to WWW server 12 through a wireless communications network (an example of which is shown in FIG. 2) including BTS 42. The WCD 32 communicates with WWW server 12 in data mode, which allows the wireless consumer at WCD 32 to navigate through Web content provided by the server. When the wireless consumer at WCD 32 desires to listen to an audio item, the WCD 32 terminates the data mode connection with WWW server 12 and establishes a voice mode connection with IVR server 22. The voice mode connection between the WCD 32 and the IVR server 22 provides a dedicated circuit for audio communication between the WCD 32 and the IVR server 22. As previously mentioned, WWW server 12 and IVR server 22 may be housed together in a single unit 25.

Figure 6:
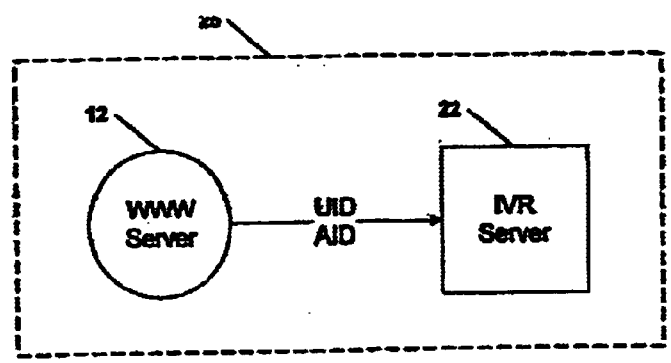
FIG. 6 is a block diagram illustrating an example communication flow between components of an architecture for providing audio items to a wireless device according to an embodiment of the present invention.

FIG. 6 is a block diagram illustrating an example communication flow between the WWW server 12 and the IVR server 22 in an architecture for providing audio items to a wireless device according to an embodiment of the present invention. Once the WWW server 12 instructs the WCD 32 to terminate the data mode connection with WWW server 12 and establish a voice mode connection with the IVR server 22, the WWW server 12 notifies the IVR server 22 of the impending connection from the WCD 32. To notify the IVR server 22, the WWW server 12 may send certain information to the IVR server 22, e.g., a unique identifier for the WCD 32 and the audio item. In one embodiment, the WWW server can uniquely identify a WCD 32 by its user identification ("UID") and uniquely identify an audio item by its audio identification ("AID").

Communication between the WWW server 12 and the IVR server 22 can be direct inter-process communication or network based communication. For example, if the WWW server 12 and the IVR server 22 are housed in a single computer 25, then inter-process communication may be advantageously used by the WWW server 12 to notify the IVR server 22 of the impending connection from WCD 32.

In addition to passing the UID for WCD 32, which may be the telephone number for the WCD 32, the WWW server 12 can also pass the AID to the IVR server 22. The AID may be any sort of identifier that accurately identifies the particular audio item requested. For example, an audio item may be represented by a unique number or combination of letters and numbers. Alternatively, the AID can be a particular location in a database or a pointer to a location on disk or in memory. An audio item can also be uniquely identified by a string of letters, perhaps representing the name of the item. In one embodiment, the AID can be a unique integer in hexadecimal format.

Figure 7:
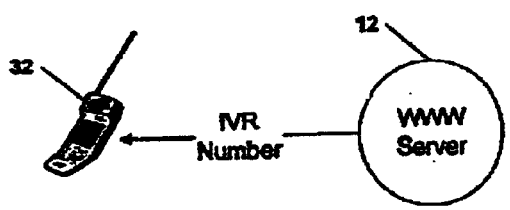
FIG. 7 is a block diagram illustrating an example communication flow between components of an architecture for providing audio items to a wireless device according to an embodiment of the present invention.

FIG. 7 is a block diagram illustrating an example communication flow between the WCD 32 and the WWW server 12 in an architecture for providing audio items to a WCD 32 according to an embodiment of the present invention. Once the WCD 32 has selected an audio item and chosen to listen to the audio item, the WWW server 12 instructs the WCD 32 to terminate the data mode connection and establish a voice mode connection with the IVR server 22 (not pictured). The Www server 12 may accomplish this by passing data to the WCD 32.

In one embodiment, the data passed to the WCD 32 by the WWW server 12 includes a telephone number for the IVR server 22. For example, the telephone number can be passed as a command to be executed by the WCD 32. Execution of the command may then cause the WCD 32 to terminate the data mode connection with the WWW server 12 and establish a voice mode connection with the IVR server 22.

Figure 8:
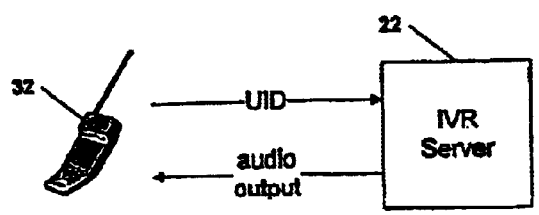
FIG. 8 is a block diagram illustrating an example communication flow between components of an architecture for providing audio items to a wireless device according to an embodiment of the present invention.

FIG. 8 is a block diagram illustrating an example communication flow between the WCD 32 and the IVR server 22 in an architecture for providing audio items to a WCD 32 according to an embodiment of the present invention. Once the WCD 32 has terminated the data mode connection with the WWW server 12 (not pictured), it establishes a voice mode connection with the IVR server 22. When connecting to the IVR server 22, the WCD 32 may pass its UID to the IVR server 22. In one embodiment, the UID allows the IVR server 22 to uniquely identify the WCD 32.

For example, the UID can be the unique telephone number assigned to the WCD 32. The UID may also be the IMEI previously described with reference to FIG. 2. When the WCD 32 connects with the IVR server 22, it passes the UID to the IVR server 22. Correspondingly, the IVR server 22 consults the information it received from the WWW server 12 to identify the AID associated with the UID for the WCD 32. Upon identifying the AID, the IVR server 22 can play the corresponding audio item and send the output to the wireless consumer at WCD 32.

Figure 9:
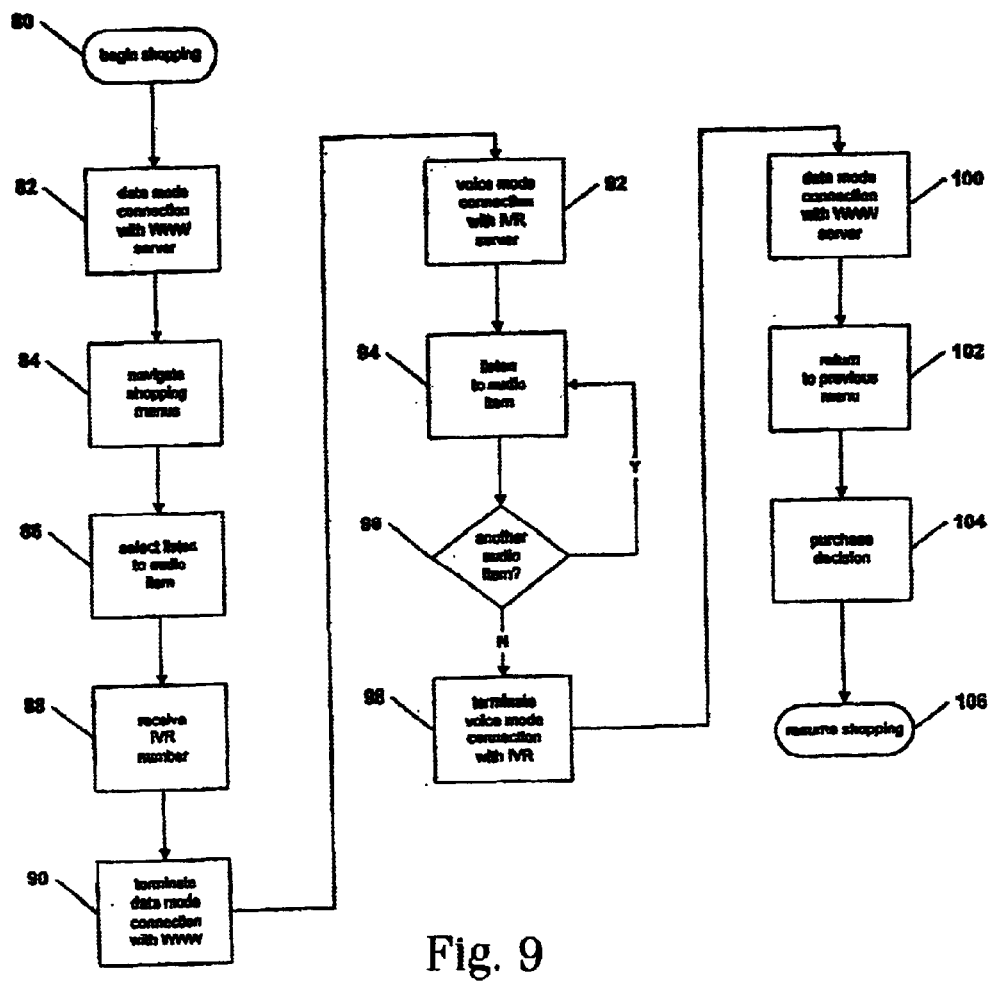
FIG. 9 is a flowchart illustrating an example process for providing audio items to a wireless device according to an embodiment of the present invention.

FIG. 9 is a flowchart illustrating an example process for providing audio items to a wireless device according to an embodiment of the present invention. The process begins when a wireless consumer begins shopping, as illustrated in step 80. The wireless device establishes a data mode connection with the WWW server in step 82. Advantageously, the data mode connection between the wireless device and the WWW server provides for efficient communication of the data comprising the shopping menus. Once connected to the WWW server, the wireless device can navigate through the shopping menus provided by the WWW server, as seen in step 84. The shopping menus can include a variety of selections, dynamically presenting new and targeted items to the wireless consumer.

In one embodiment, the wireless consumer can navigate through the shopping menus and select a category that contains audio items. For example, the audio items may include soundtracks from movies, compact disc albums from musical artists, or books on tape, to name just a few. When a desired audio item is located, the wireless consumer can select to listen to the audio item, as shown in step 86.

Once the wireless consumer has selected to listen to the audio item, the WWW server instructs the wireless device to terminate the data mode connection. Advantageously, the WWW server may notify the wireless device by embedding the telephone number for the IVR server in a command that is sent to the wireless device, as illustrated in step 88. The phone number can be received by the wireless device in the form of a command. The wireless device, when dialing the phone number for the IVR server, first terminates the data mode connection with the WWW server, as seen in step 90. The dialing of the phone number for the IVR server connects the wireless device to the IVR server in voice mode, as shown in step 92. Advantageously, the mode voice connection with the IVR server increases the sound quality for audio items transmitted over the connection.

The wireless consumer can then listen to the audio item played by the IVR server, as illustrated in step 94. In one embodiment, the wireless consumer can listen to additional audio items, as shown in step 96. For example, the wireless consumer may navigate through a menu system provided by the IVR server. Once the wireless consumer is finished listening to audio items, the wireless device terminates the voice connection with the IVR server, as illustrated in step 98.

Upon terminating the voice connection with the IVR server, the wireless device re-establishes a data connection with the Www server, as seen in step 100. In one embodiment, the WWW server can maintain state information for the wireless device. Advantageously, when the wireless device reconnects to the WWW server in data mode, the WWW server can return the wireless consumer to the point in the menu system where the shopping session was previously terminated, as illustrated in step 102. Preferably, the wireless consumer can, in step 104, be presented with the option to purchase the audio item. Whether or not the audio item is purchased, the wireless consumer can resume the on-line shopping session through the existing data mode connection with the WWW server, as illustrated in step 106.

Figure 10A:
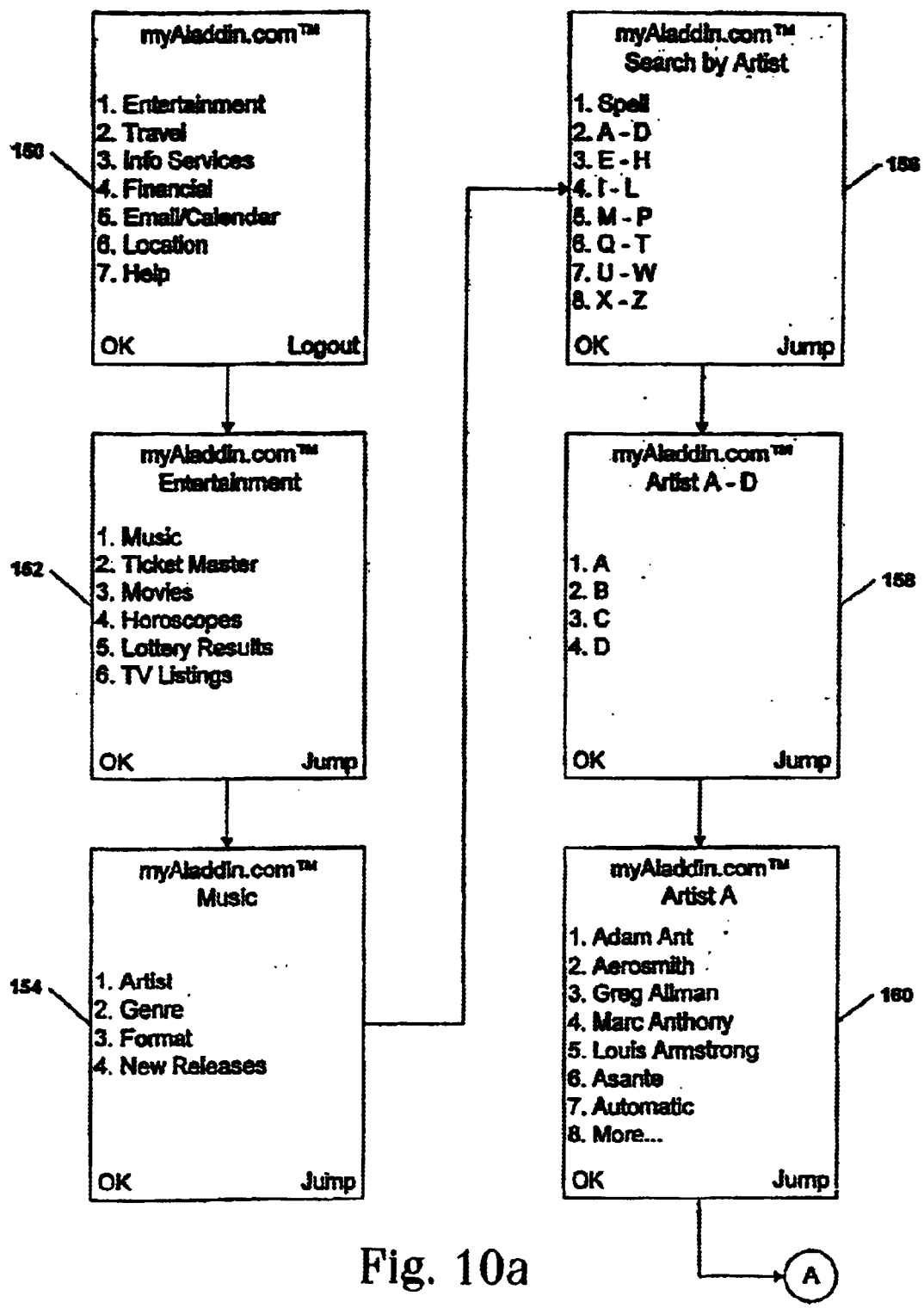
FIG. 10 is a set of screen shots illustrating an example sequence of user interface screens for providing audio items to a wireless device according to an embodiment of the present invention.
Figure 10B:
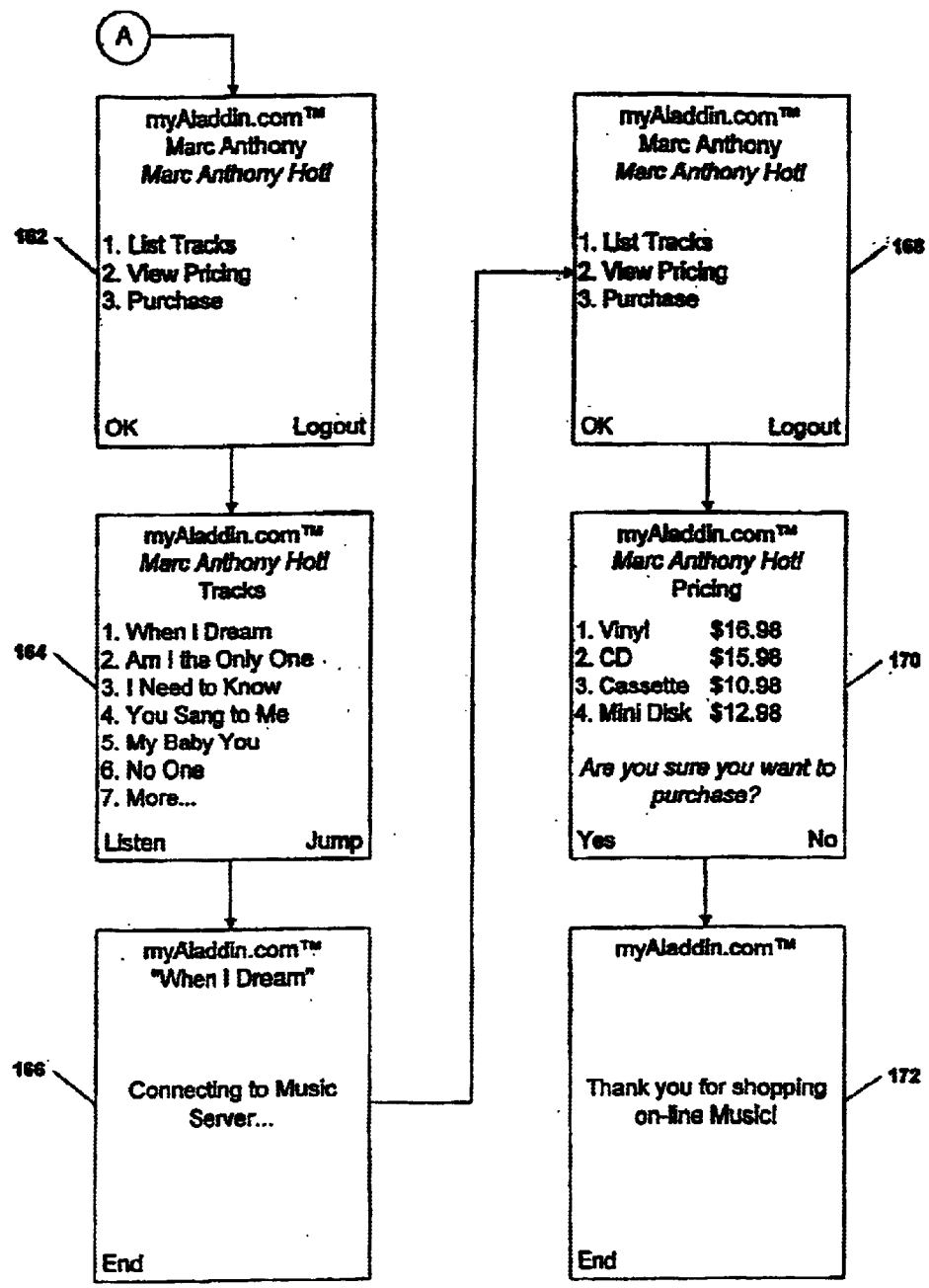

FIG. 10 is a set of screen shots illustrating an example sequence of user interface screens for providing audio items to a wireless device according to an embodiment of the present invention. Once the wireless consumer has connected to the WWW server, the wireless device presents the shopping menus as directed by the WWW server. For example, an initial shopping menu may contain top level categories such as entertainment, travel, information services, financial services, location services, and email or calendar services, as presented in screen 150.

In one embodiment, a wireless consumer may select the entertainment menu item with the intention of shopping for a music CD. Screen 152 shows different sub-categories of the entertainment menu item. For example, music, Ticket Master™, movies, horoscopes, lottery results and TV listings may be included on an entertainment menu. Selecting music from this screen causes the wireless device to navigate to the music menu, as illustrated in screen 154. Sub-categories for the music screen can include, for example, artist, genre, format, and new releases, to name just a few.

In one embodiment, navigating to the artist selection can cause the search by artist screen to be presented to the wireless consumer, as illustrated by screen 156. A plurality of ways to search for an artist are contemplated by the present invention, one particular example being an alphabetical search. For example, the wireless consumer may choose to spell the artist's name or perform an artist lookup by the first letter of the artist's name. Such a lookup, in one embodiment, may comprise selecting a range of letters.

For example, selecting the A–D range of letters can cause screen 158 to appear, allowing the wireless consumer to select the specific letter desired. Selecting the specific letter, for example A, can cause a list of artists beginning with A to appear, as illustrated in screen 160. The list may contain more artists than appear on the screen of the wireless device and therefore there may be presented an option to see more selections. Once the wireless consumer has selected the desired artist from the list, the artist's current release can be presented to the wireless consumer, as shown in screen 162. In an alternative embodiment, the wireless consumer may be presented with a list of available releases for the particular artist prior to screen 162. For example, the wireless consumer may be prompted to select the desired CD in an interim screen and subsequently be presented with the specific release options as shown in screen 162.

Once the wireless consumer is viewing information for a particular release, the wireless consumer may have the option to list the tracks on the release, view pricing information for the release, or purchase the release. For example, selecting to list the tracks on the release may cause screen 164 to be presented to the wireless consumer, which displays the name of each song on the release. While reviewing the tracks on a release, the wireless consumer may be presented with the option to listen to a track. Upon selecting a particular track to listen to, the wireless consumer is presented with screen 166, which informs the wireless consumer that the wireless device is establishing a voice mode connection to the audio or music server. Advantageously, the name of the audio item or song to be listened to may be displayed on the screen of the wireless device.

Once the wireless device connects to the IVR server in voice mode, the IVR server plays the audio item for the wireless consumer. The audio item is played over a voice connection, which advantageously provides more robust audio service than the data mode connection. In one embodiment, the IVR server may introduce the audio item with a brief commercial prior to playing the audio item. When the user finishes listening to the audio item, the wireless consumer may have the option to listen to additional audio items. Once the user finishes interacting with the IVR server, and consequently finishes listening to the audio item or items, the voice mode connection is terminated and the data mode connection with the WWW server is re-established.

In one embodiment, the browser on the wireless device maintains certain state information pertaining to the on-line shopping session that initiated the voice connection to listen to the audio item. Upon completion of the voice connection, the browser may re-establish the previously terminated data mode connection with the WWW server in order to resume the shopping session. Advantageously, the WWW server may also maintain state information for the particular wireless device that terminated the data mode connection in order to provide the audio item to the wireless consumer. In one embodiment, this state information allows the WWW server to return the wireless consumer to the purchase screen pertaining to the particular audio item, as illustrated by screen 168.

Upon being returned to the shopping session, the wireless consumer may select to purchase the release, which may present the purchase options, as depicted in screen 170. For example, purchase options may allow the wireless consumer to purchase the release as a CD, an LP (Vinyl), a cassette, or as a mini disk. Furthermore, screen 170 may present the wireless consumer with a confirmation message to ensure that the wireless consumer desires to purchase the selected item. Finally, after the wireless consumer has selected to purchase the release, a completion message may be presented to the wireless consumer, as shown in screen 172. For example, the completion message may thank the wireless consumer for purchasing the release.

Figure 11:
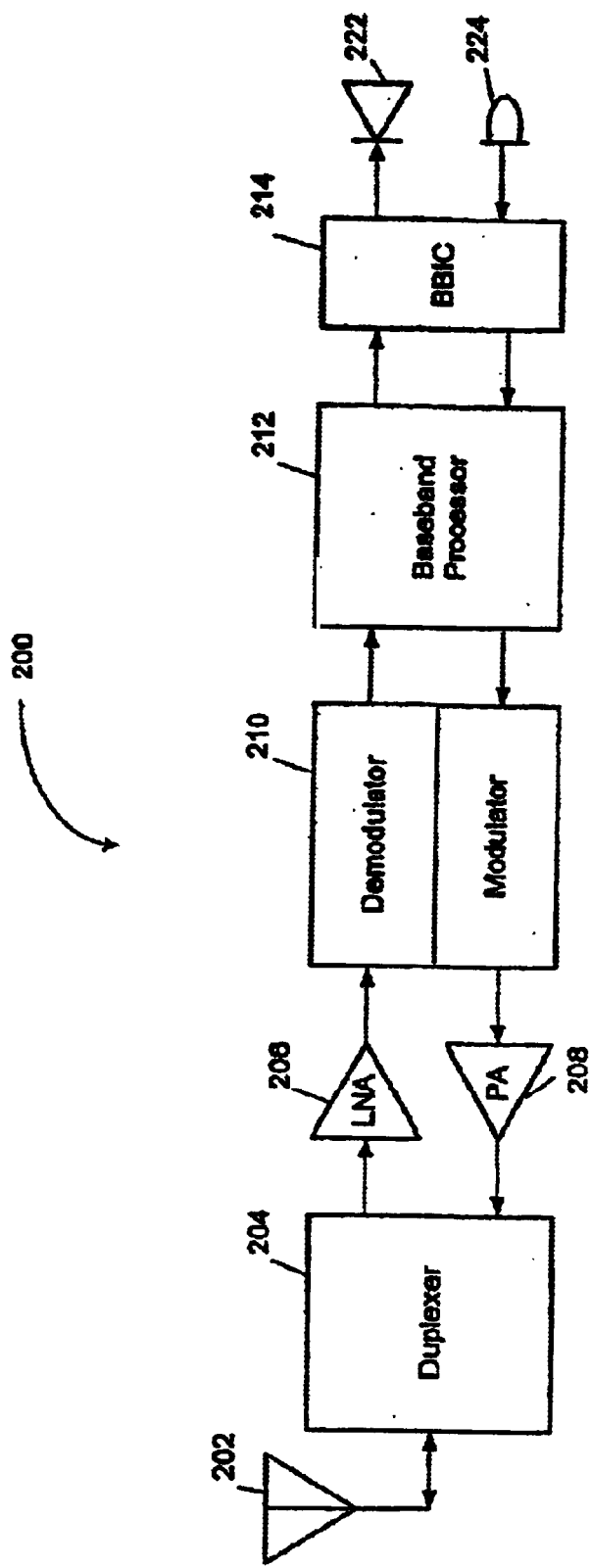
FIG. 11 is a block diagram illustrating an exemplary wireless communications device as may be used in connection with various embodiments described herein.

FIG. 11 is a block diagram illustrating an exemplary wireless communication device 32 which may be used in connection with various embodiments described herein. Wireless communication device 32 may include a base-band audio integrated circuit ("BBIC") 214 in accordance with the invention. In device 32, radio frequency ("RF") signals are transmitted and received by antenna 202. Duplexer 204 acts as a switch, coupling antenna 202 between transmit and receive signal paths. In the receive path, received RF signals are coupled from a duplexer 204 to Low Noise Amplifier ("LNA") 206. LNA 206 amplifies the received RF signal and couples the amplified signal to a demodulation portion of a modulation circuit 210.

Typically modulation circuit 210 will combine a demodulator and modulator in one integrated circuit ("IC"). The demodulator and modulator can, of course, be separate components. The demodulator strips away the RF carrier leaving a base-band receive audio signal, which is coupled from the demodulator output to base-band processor ("BBP") 212.

If the base-band receive audio signal contains audio information, then BBP 212 routes the signal to BBIC 214, where it is decoded, converted to an analog signal, amplified, and sent to speaker 222. BBIC 214 also receives analog audio signals from microphone 224, which are converted to digital signals encoded and routed to BBP 212. BBP 212 codes the digital signals for transmission and generates a base-band transmit audio signal that is routed to the modulation portion of modulation circuit 210. The modulator mixes the base-band transmit audio signal with an RF carrier generating an RF transmit signal that is routed to power amplifier ("PA") 208. PA 208 amplifies the RF transmit signal and routes it to duplexer 204. Duplexer 204 switches the RF transmit signal over to the duplexer 204 antenna port so that it can be transmitted by antenna 202.

Figure 12:
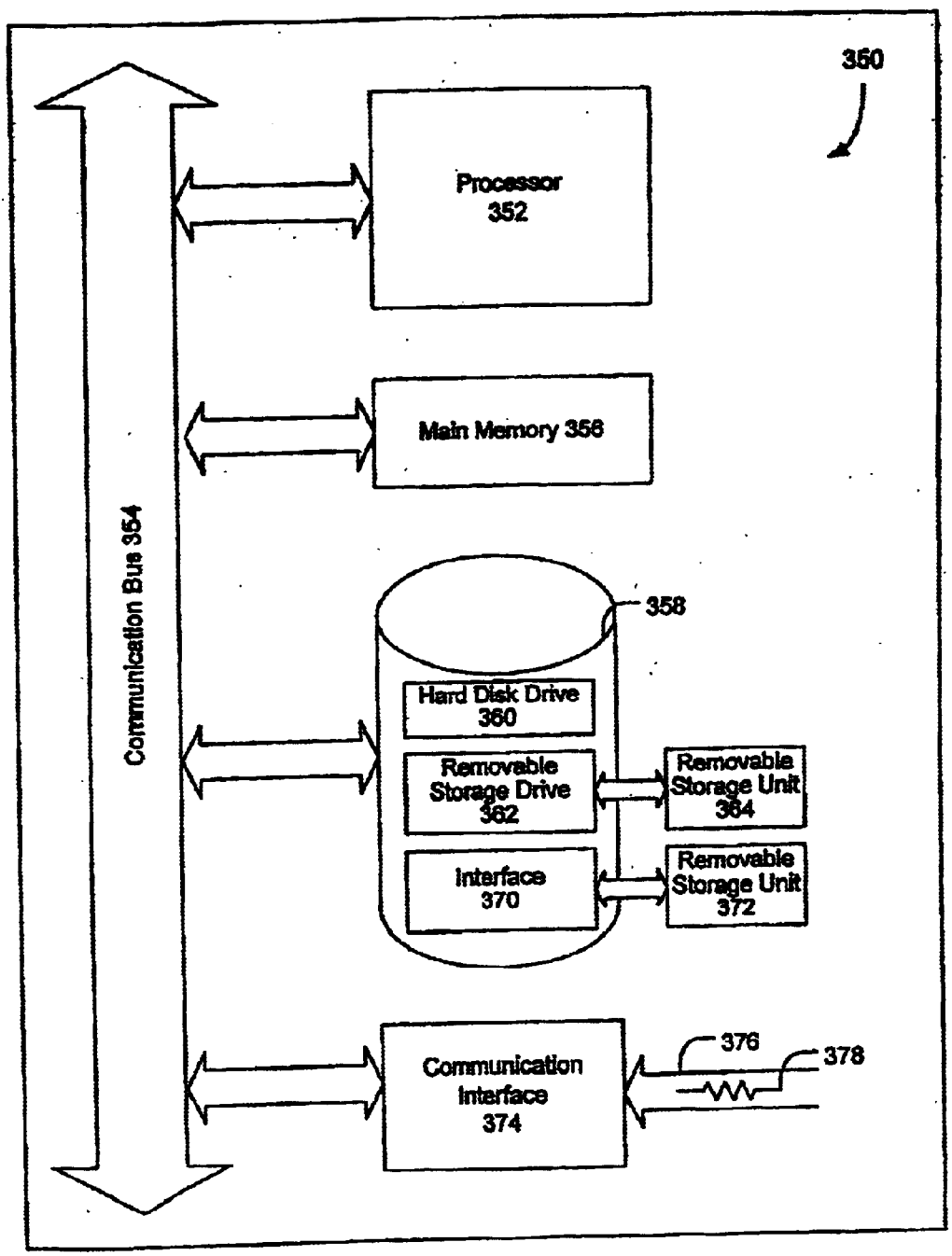
FIG. 12 is a block diagram illustrating an exemplary computer system as may be used in connection with various embodiments described herein.

FIG. 12 is a block diagram illustrating an exemplary computer system 350 which may be used in connection with various embodiments described herein. For example, the computer system 350 may be used to run a mobile switching center 50, or to provide connectivity, data storage, and other features useful for operating a wireless communications network. However, other computer systems and/or architectures may be used, as will be clear to those skilled in the art.

The computer system 350 preferably includes one or more processors, such as processor 352. Additional processors may be provided, such as an auxiliary processor to manage input/output, an auxiliary processor to perform floating point mathematical operations, a special-purpose microprocessor having an architecture suitable for fast execution of signal processing algorithms ("digital signal processor"), a slave processor subordinate to the main processing system ("back-end processor"), an additional microprocessor or controller for dual or multiple processor systems, or a coprocessor. Such auxiliary processors may be discrete processors or may be integrated with the processor 352.

The processor 352 is preferably connected to a communication bus 354. The communication bus 354 may include a data channel for facilitating information transfer between storage and other peripheral components of the computer system 350. The communication bus 354 further may provide a set of signals used for communication with the processor 352, including a data bus, address bus, and control bus (not shown). The communication bus 354 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

Computer system 350 preferably includes a main memory 356 and may also include a secondary memory 358. The main memory 366 provides storage of instructions and data for programs executing on the processor 352. The main memory 356 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, as well as read only memory (ROM).

The secondary memory 358 may optionally include a hard disk drive 360 and/or a removable storage drive 362, for example a floppy disk drive, a magnetic tape drive, an optical disk drive, etc. The removable storage drive 362 reads from and/or writes to a removable storage unit 364 in a well-known manner. Removable storage unit 364 may be, for example, a floppy disk, magnetic tape, optical disk, etc. which is read by and/or written to by removable storage drive 362. The removable storage unit 364 includes a computer usable storage medium having stored therein computer software and/or data.

In alternative embodiments, secondary memory 358 may include other similar means for allowing computer programs or other instructions to be loaded into the computer system 350. Such means may include, for example, a removable storage unit 372 and an interface 370. Examples of secondary memory 358 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units 372 and interfaces 370, which allow software and data to be transferred from the removable storage unit 372 to the computer system 350.

Computer system 350 may also include a communication interface 374. The communication interface 374 allows software and data to be transferred between computer system 350 and external devices, networks or information sources. Examples of some types of components that might comprise communication interface 374 include a modem, a network interface (such as an Ethernet card), a communications port, a PCMCIA slot and card, and an infrared interface, to name a few. Communication interface 374 preferably implements industry promulgated protocol standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement non-standard interface protocols as well. Software and data transferred via communication interface 374 are generally in the form of signals 378 which may be electronic, electromagnetic, optical or other signals capable of being received by communication interface 374. These signals 378 are provided to communication interface 374 via a channel 376. This channel 376 carries signals 378 and can be implemented using wire or cable, fiber optics, a phone line, a cellular phone link, a radio frequency (RF) link, or other communications channels.

Computer programming instructions (i.e., computer programs or software) are stored in the main memory 356 and/or the secondary memory 358. Computer programs can also be received via communication interface 374. Such computer programs, when executed, enable the computer system 350 to perform the features relating to the present invention as discussed herein.

In this document, the term "computer program product" is used to refer to any media used to provide programming instructions to the computer system 350. Examples of these media include removable storage units 364 and 372, a hard disk installed in hard disk drive 360, and signals 378. These computer program products are means for providing programming instructions to the computer system 350.

In an embodiment that is implemented using software, the software may be stored in a computer program product and loaded into computer system 350 using hard drive 360, removable storage drive 362, interface 370 or communication interface 374. The software, when executed by the processor 352, may cause the processor 352 to perform the features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will be apparent those skilled in the relevant art. Various embodiments may also be implemented using a combination of both hardware and software.

While the particular method for sampling audio recordings such as music on a wireless communication device herein shown and described in detail is fully capable of attaining the above described objects of this invention, it is to be understood that the description and drawings represent the presently preferred embodiment of the invention and are, as such, a representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

What is claimed is:

1. A method for sending an audio item to a wireless device wherein said wireless device is communicatively coupled with a non-audio data server and an audio server over a wireless communications network, the method comprising:

at the non-audio data server:
receiving a first non-audio data connection from the wireless device;
accepting a selection for the audio item;
providing the wireless device with a telephone number for the audio server;
instructing the wireless device to connect to the audio server;
notifying the audio server of the selected audio item; and
providing the audio server with a unique identifier for the wireless device and a unique identifier for the audio item;
terminating the first non-audio data connection from the wireless device upon the audio server receipt of an audio connection from the wireless device; and at the audio server:
receiving an audio connection from the wireless device;
verifying the wireless device by its unique identifier; and
sending an audio output from the audio item to the wireless device;

wherein the non-audio data server transfers data to the wireless device in a packet switching data mode, wherein data packets may be discontiguous, and wherein the audio server transfers data to the wireless device in a dedicated circuit voice mode, wherein serial audio data is contiguous; and wherein the audio connection for the wireless device is terminated after said sending an audio output, and a second non-audio data connection from the wireless device is thereupon established.

2. The method of claim 1 wherein the data server computer and the audio server computer are the same computer.

3. The method of claim 1 further comprising at the date server computer:
maintaining a state information for the wireless device; and
receiving a third connection from the wireless device wherein the connection resumes at the place indicated by the state information.

4. A method of listening to an audio item on a wireless device wherein the wireless device is communicatively coupled with a non-audio data server and an audio server over a wireless communications network, the method comprising:
establishing a first non-audio data connection between the wireless device and the non-audio data server;
navigating a menu system provided by the non-audio data server; selecting the audio item;
choosing to listen to the audio item;
receiving a telephone number for the audio server;
disconnecting from the non-audio data server;
establishing an audio connection between the wireless device and the audio server;
listening to the audio item through the wireless device;
disconnecting from the audio server;
establishing a second non-audio data connection between the wireless device and the non-audio data server; and
resuming interaction with the non-audio data server at the place in the menu system from which the disconnecting from the non-audio data server step was performed;

wherein the non-audio data server transfers data to the wireless device in a packet switching data mode, wherein data packets may be discontiguous, and wherein the audio server transfers data to the wireless device in a dedicated circuit voice mode, wherein serial audio data is contiguous.

5. The method of claim 4 wherein the receiving step comprises:

receiving instructions to disconnect from the date server computer;

receiving a telephone number for the audio server computer; and receiving instructions to establish a connection between the wireless device and the audio server computer.

6. The method of claim 4 wherein the listening step further comprises:

listening to a preamble item; and listening to the audio item.

7. The method of claim 6 further comprising listening to additional audio items after the audio item is complete.

8. The method of claim 4 wherein the data server computer and the audio server computer are the same computer.

9. A computer system or sending an audio item to a wireless device wherein the wireless device is communicatively coupled with a non-audio data server and an audio server over a wireless communications network, the system comprising:

the non-audio data server suited to:
receive a connection from the wireless device;
accept a selection for the audio item;
provide access information for the audio server;
instruct the wireless device to connect to the audio server;
terminating the first non-audio data connection from the wireless device upon the audio server receipt of an audio connection from the wireless device; and the audio server suited to:
receive a connection from the wireless device;
verify the wireless device by a unique identifier; and
send the audio item to the wireless device;

wherein the non-audio data server transfers data to the wireless device in a packet switching data mode, wherein data packets may be discontiguous, and wherein the audio server transfers data to the wireless device in a dedicated circuit voice mode, wherein serial audio data is contiguous; and wherein the audio connection for the wireless device is terminated after said sending an audio output, and a second non-audio data connection from the wireless device is thereupon established.

10. The system of claim 9 wherein the data server computer is further configured to:

provide the audio server computer with an identifier for the wireless device; and provide the audio server computer with an identifier for the audio item.

11. The system of claim 9 wherein the access information for the audio server computer comprises a telephone number.

12. The system of claim 9 wherein the data server and the audio server comprise a single computer.

13. A computer readable medium having stored thereon one or more sequences of instructions for causing one or more processors to perform the steps for listening to an audio item on a wireless device, wherein the wireless device is communicatively coupled with a non-audio data server and an audio server over a wireless communications network, the steps comprising:

establishing a first non-audio data connection between the wireless device and the non-audio data server;

selecting the audio item;

choosing to listen to the audio item;

disconnecting from the non-audio data server;

establishing an audio connection between the wireless device and the audio server; and listening to the audio item through the wireless device;

wherein the non-audio data server transfers data to the wireless device in a packet switching data mode, wherein data packets may be discontiguous, and wherein the audio server transfers data to the wireless device in a dedicated circuit voice mode, wherein serial audio data is contiguous; and, wherein the audio connection for the wireless device is terminated after said listening to the audio item through the wireless device, and a second non-audio data connection from the wireless device is thereupon established.

14. The computer readable medium of claim 13 wherein the disconnecting from the data server computer step further comprises receiving from the data server computer:

instructions to disconnect from the data server computer;

a telephone number for the audio server computer; and instructions to establish the second connection between the wireless device and the audio server computer.

15. The computer readable medium of claim 14 further comprising:

disconnecting from the audio server computer;

establishing a third connection between the wireless device and the data server computer; and resuming interaction with the data server computer at the place in the menu system from which the disconnecting from the data server computer step was performed.

16. The computer readable medium of claim 15 wherein the listening step further comprises:

listening to a preamble item; and listening to the audio item.

17. The computer readable medium of claim 16 further comprising listening to additional audio items after the audio item is complete.

18. The computer readable medium of claim 17 wherein the selecting step further comprises:

navigating a menu system provided by the data server computer; and viewing summary information regarding the audio item.

* * * * *